United States Patent [19]

Parker

[11] 3,894,350

[45] July 15, 1975

[54] AUDIBLE FISHING LURE

[76] Inventor: Douglas W. Parker, 615 Rogers Ave., Fort Smith, Ark. 72901

[22] Filed: Jan. 28, 1974

[21] Appl. No.: 436,971

[52] U.S. Cl. ............................... 43/42.31; 43/42.35
[51] Int. Cl.² ........................................ A01K 85/00
[58] Field of Search ..................... 43/42.31, 42.35

[56] References Cited
UNITED STATES PATENTS
2,488,678  11/1949  Nardi ............................. 43/42.31 X
2,716,830  9/1955  Burden .......................... 43/42.31 X
3,757,455  9/1973  Strader ......................... 43/42.31 X Primary Examiner—Louis G. Mancene
Assistant Examiner—Daniel J. Leach
Attorney, Agent, or Firm—Lowe, Kokjer, Kircher, Wharton & Bowman

[57] ABSTRACT

An artificial fishing lure having a pellet captured within a noise chamber. An acoustic chamber adjacent the noise chamber amplifies sound transmitted through a passageway interconnecting the noise and amplification chambers.

6 Claims, 7 Drawing Figures

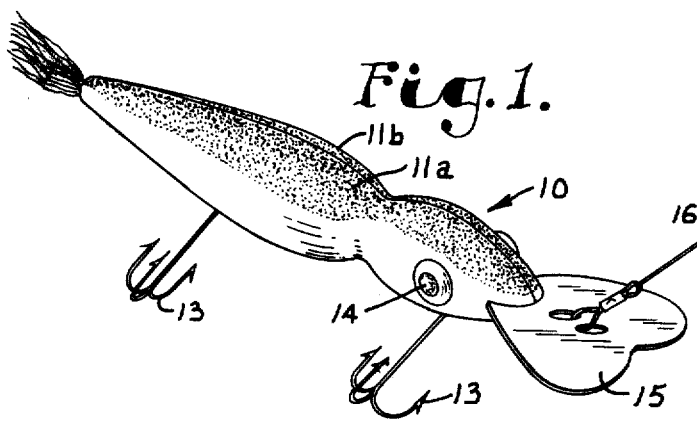
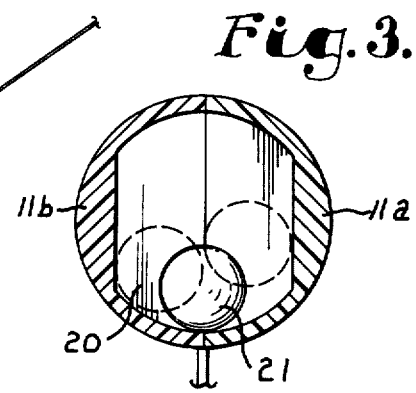
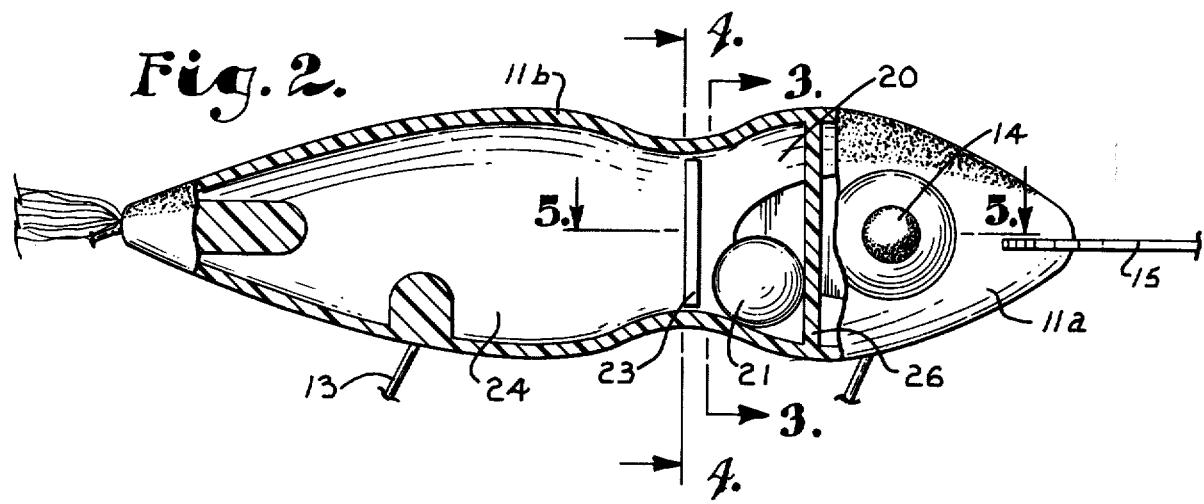
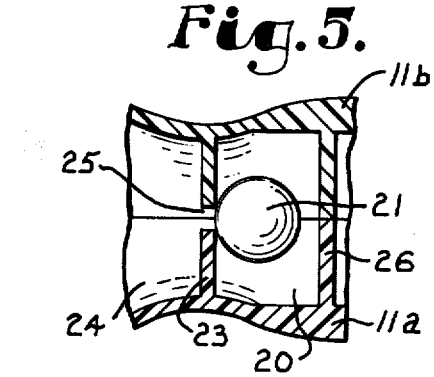
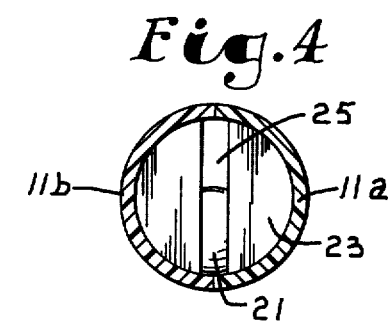
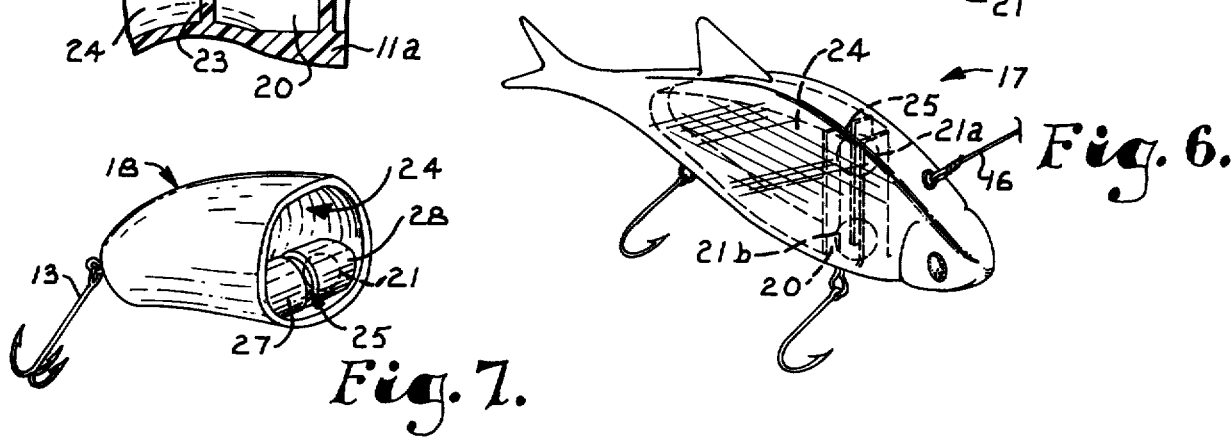

3,894,350

AUDIBLE FISHING LURE

BACKGROUND AND SUMMARY OF THE INVENTION

This invention relates to artificial fishing lures, and more particularly to lures having self-contained sound sources.

Providing a source of sound inside a fishing lure as a means of attracting fish is well known. The most common method of producing an audible lure is to place a metallic pellet within the hollow interior of the lure. As collisions occur between the pellet or pellets and the inside wall of the lure, sound is generated and, when propagated through the water, fish are attracted.

In the prior art, a single sound chamber is employed wherein a pellet randomly collides with the lure walls. With this arrangement, problems have been encountered in obtaining sufficient sound amplification and in providing high frequency pulses in a preferred fish attracting range.

Accordingly, a primary object of this invention is to provide an audible fishing lure having greater noise pulse frequency without sacrifice of amplification. In the instant invention two interior lure chambers are provided. A pellet is housed in a small sound generating chamber, and a larger acoustic chamber, which is three to ten times greater in volume than the sound generating chamber, adjoins it. Separating the two chambers is a wall having an opening there-through whereby sound produced by the random collisions of the pellet in the sound generating chamber is transmitted to the larger acoustic chamber. This results in sound amplification, in accordance with the relative sizes of the two chambers, and the amplified sound is transmitted through the walls of the lure to the surrounding water to arouse and attract fish.

Another object of the invention is to provide within a fishing lure amplification of the sounds produced by a noise generating source located therein.

An additional object of this invention is to provide a fishing lure which will radiate noise of an amplitude greater than heretofore achieved, yet with a higher rate of occurrence. By providing a sound generating chamber of relatively small size compared to the pellet, a greater number of collisions per unit of time is accomplished.

A further object of the invention is to provide a sound chamber design which may be conveniently incorporated in the conventional fishing lure manufacturing process.

Other and further objects of the invention, together with the features of novelty appurtenant thereto, will appear in the course of the following description.

DESCRIPTION OF THE DRAWING

In the accompanying drawing which forms a part of the specification and is to be read in conjunction therewith, and in which like reference numerals are employed to indicate like parts in the various views:

FIG. 1 is a perspective view of a typical fishing lure which may be adapted to incorporate the sound generating means constructed in accordance with a preferred embodiment of the invention;

FIG. 2 is a side sectional view of the lure shown in FIG. 1;

FIG. 3 is a sectional view of the lure taken along line 3—3 of FIG. 2 in the direction of the arrows;

FIG. 4 is a sectional view of the lure taken along line 4—4 of FIG. 2 in the direction of the arrows;

FIG. 5 is a fragmentary sectional view of the lure taken along line 5—5 of FIG. 2 in the direction of the arrows;

FIG. 6 is a perspective view of another typical fishing lure which may be adapted to incorporate the sound generation means taught herein; and FIG. 7 is a fragmentary perspective view showing a portion of a fishing lure body incorporating an alternative embodiment of the sound generating means.

At the outset, it should be emphasized that this invention may be adapted to a wide variety of conventional styles and designs for artificial fishing lures. FIG. 1 illustrates one such typical design wherein the body 10 is normally constructed from a pair of molded plastic component halves 11a and 11b which are securely glued together along the central longitudinal seam. The lure 10 is equipped with hooks 13, eyes 14 and a hydrofoil 15. FIG. 6 illustrates another conventional lure 17 which may interiorially incorporate the noise generation means herein disclosed. The fishing lures, such as styles 10 and 17 to which this invention is most advantageously adapted, display a tendency to vibrate or wiggle when pulled through the water by means of a fishing line 16.

Referring then to the drawings in more detail, FIG. 2 is an enlarged interior view of the lure 10 as shown in FIG. 1. Near the forward end of the lure is a sound generation chamber 20 formed in the hollow interior of the lure and in which is captured a pellet 21. The pellet 21 is preferably a metallic spheroid, but other materials and shapes may obviously be used to achieve equally satisfactory results. The volume of the pellet 21 is approximately 10 to 50% of the volume of the chamber 20 according to the vibrational frequency desired.

An acoustic sound amplification chamber 24 is located immediately adjacent the sound generation chamber 20 and is separated therefrom by a baffle or wall 23 having an aperture or slot 25. Slot 25 is of narrower dimension than the size of the pellet 21 in order to prevent the pellet from escaping the chamber 20. Noise generated in chamber 20 will propagate through the aperture 25 in wall 23 and, since the volume of amplification chamber 24 is three to ten times larger than the volume of chamber 20, the transmitted sound is resonantly amplified through the cavity of the lure body 10.

It should be noted that within the criteria indicated the sound generation chamber 20 may be located at any convenient location within the cavity of the lure, and need not be adjacent the forward interior wall 26. Such location may be advantageously varied to change the balance of the lure in the water by appropriately positioning the chamber 20 and its associated weight provided by the pellet 21. The necessary baffles and interior walls needed to define the sound chamber may be integrally molded with the lure halves 11a and 11b. The pellet 21 is then placed within the chamber when the two halves are glued together.

FIG. 7 illustrates, as an example, an alternative positioning of the sound chamber 20 located in the rearward portion of a lure body 18 and formed by cylindrical interior walls 27 and 28. Sound generated by the pellet 21 is transmitted through the transmission gap 25 to the amplification chamber 24.

When the lure 10 is pulled through the water, as by line 16, the natural vibration of the lure causes the pellet 21 to randomly collide with the walls defining the noise chamber 20. During a given period of time of vibrations, a larger number of pellet collisions occur in chamber 20 than would occur if the pellet 21 was located in a larger chamber such as one approximating the size of chamber 24. This utilization of a relatively small chamber 20 to confine the pellet 21 produces a larger frequency of noise pulses when the lure 10 experiences a given vibration. Since the pellet travels less distance between collisions to achieve greater frequency, less energy is dissipated per collision so that the noise accordingly has a smaller amplitude. By providing amplification chamber 24 adjacent chamber 20 and a transmission passageway 25 thereto, sufficient amplification of the greater frequency pulses is achieved and sound radiates through the lure body into the surrounding water, thus attracting fish.

It may also be desirable to include more than one pellet member within the sound chamber 20. As shown in FIG. 6, two pellets 21a and 21b are captured within the chamber 20 so that sound is generated by collision of the pellets themselves in addition to the collisions with the walls of the lure. When employing more than one pellet, then the combined volumes of the pellets are approximately 10% to 50% of the volume of the sound chamber.

From the foregoing, it will be seen that this invention is one well adapted to attain all the ends and objects hereinabove set forth, with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth, or shown in the accompanying drawing, is to be interpreted as illustrative and not in a limiting sense.

Having thus described my invention, I claim:

1. An audible, artificial fishing lure comprising:
    a substantially hollow lure body;
    a first sealed interior cavity disposed within said lure body;
    a pellet member disposed within said first cavity to produce audible sounds by random collisions with the interior of said first cavity as said lure vibrates when traveling through water;
    a second sealed interior cavity disposed within said lure body adjacent said first cavity, said second cavity being larger than said first cavity;
    a partition member separating said first and second cavities; and
    an aperture through said partition member for transmitting sounds produced by said pellet within said first cavity to said second cavity, said aperture having at least one dimension thereof smaller than said pellet.

2. The fishing lure as in claim 1, said pellet occupying approximately 10 to 50% of the volume of said first cavity.

3. The fishing lure as in claim 1, said second cavity having a volume equal to approximately three to ten times the volume of said first cavity whereby sounds transmitted from said first cavity to said second cavity are amplified therein.

4. The fishing lure as in claim 3, said pellet occupying approximately 10 to 50% of the volume of said first cavity.

5. The fishing lure as in claim 1, including a plurality of pellet members disposed within said first cavity.

6. The fishing lure as in claim 5, said plurality of pellet members occupying approximately 10 to 50% of the volume of said first cavity.

* * * * *